Oct. 25, 1932.   R. O. STOKES   1,885,064
CONVEYING MECHANISM
Filed May 23, 1932   5 Sheets-Sheet 1
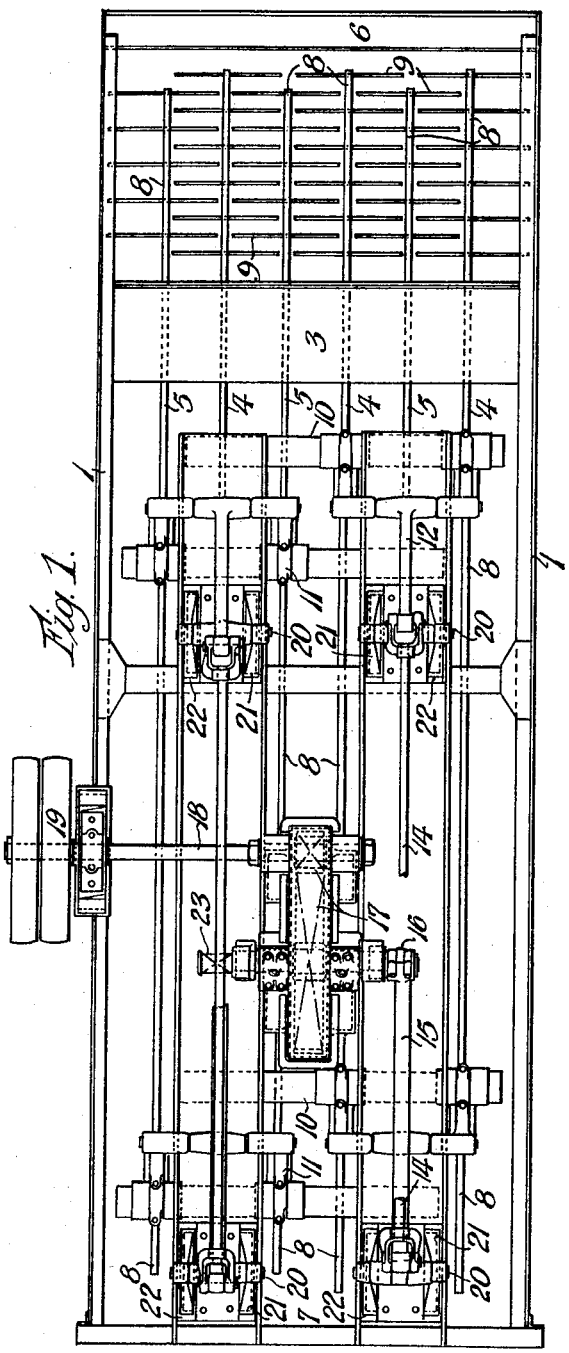
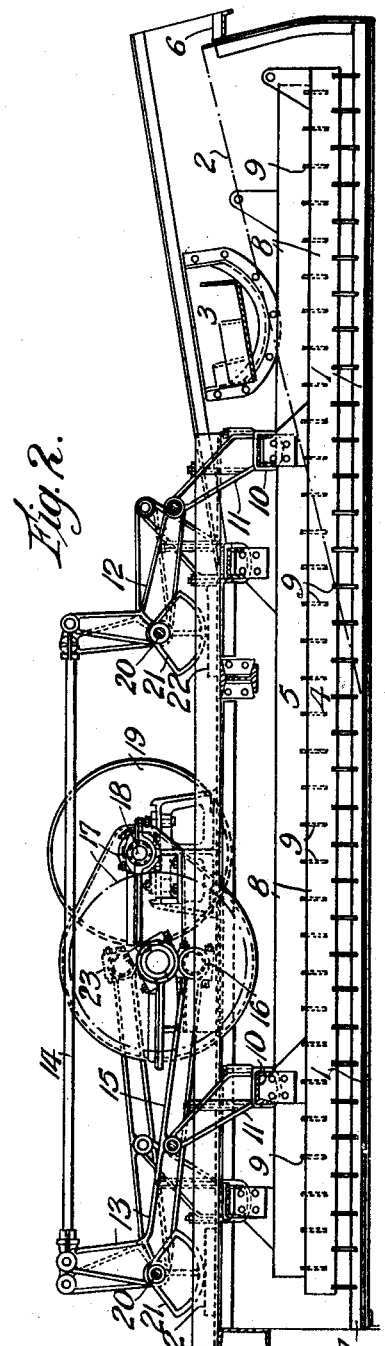

Oct. 25, 1932.    R. O. STOKES    1,885,064
CONVEYING MECHANISM
Filed May 23, 1932    5 Sheets-Sheet 2

Inventor
Rupert O. Stokes
By his atty.
Baldwin Wight

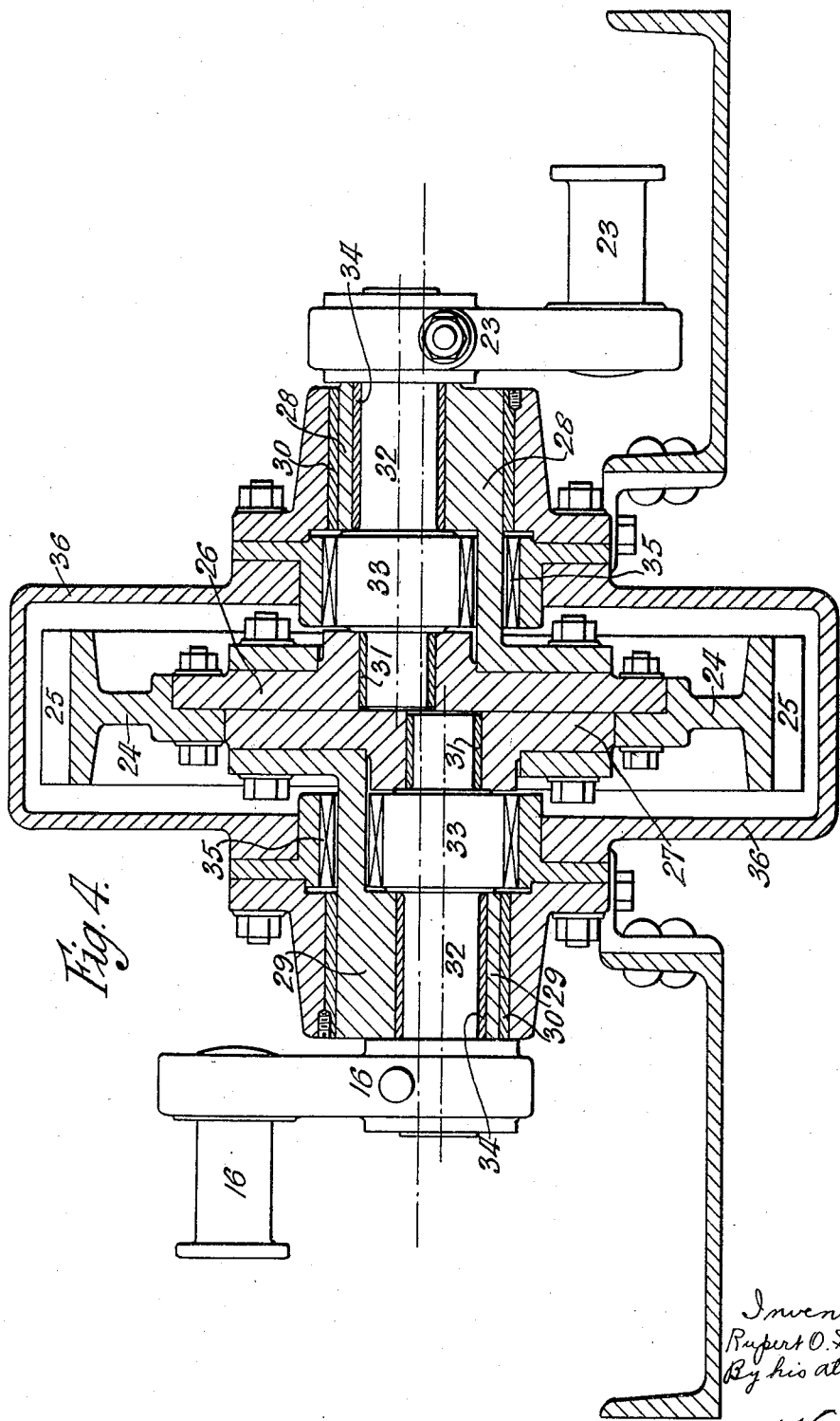

Oct. 25, 1932.  R. O. STOKES  1,885,064
CONVEYING MECHANISM
Filed May 23, 1932  5 Sheets-Sheet 4
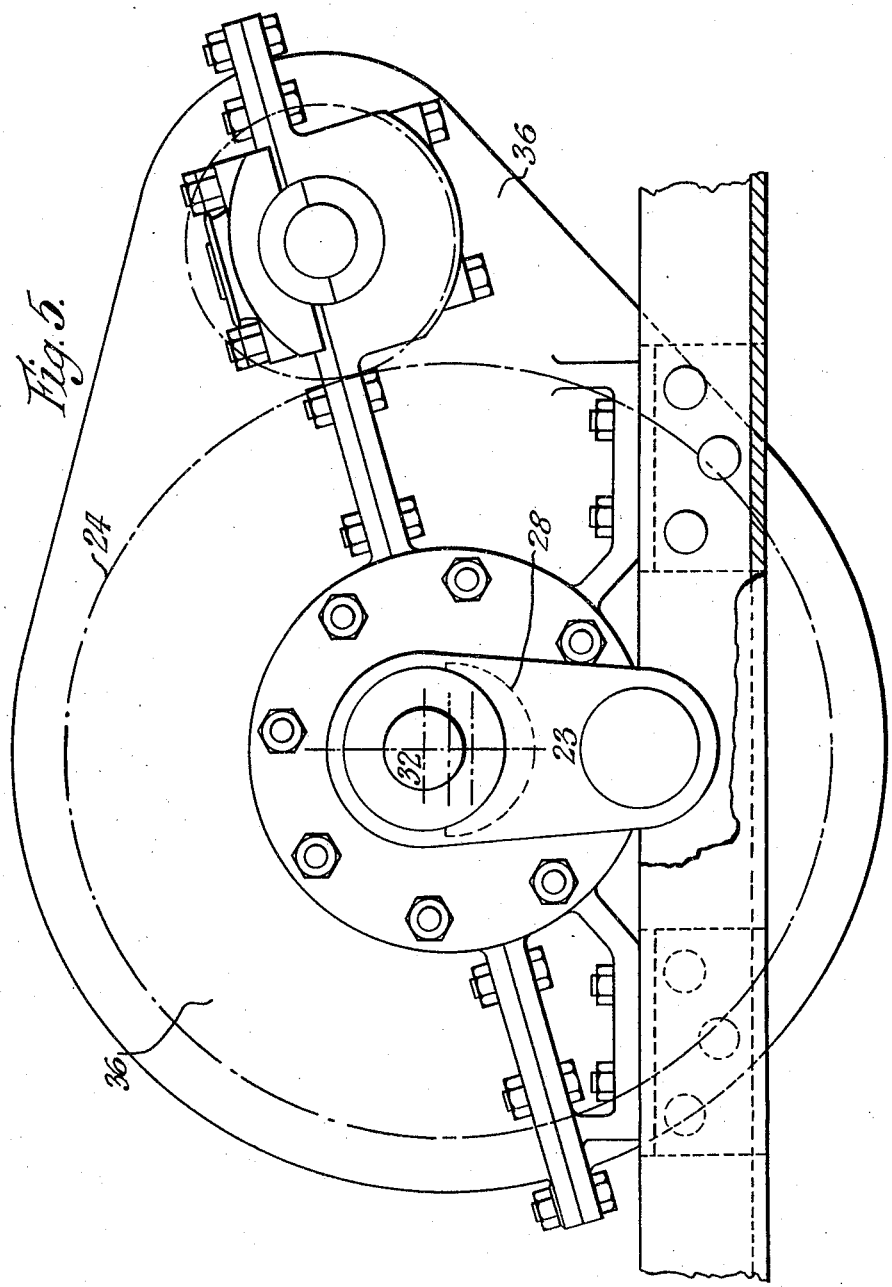

Oct. 25, 1932.  R. O. STOKES  1,885,064
CONVEYING MECHANISM
Filed May 23, 1932  5 Sheets-Sheet 5
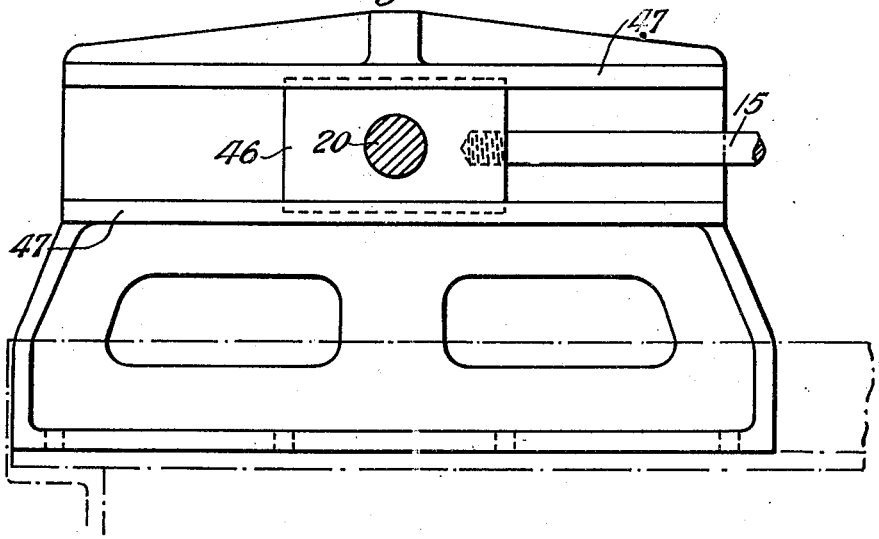
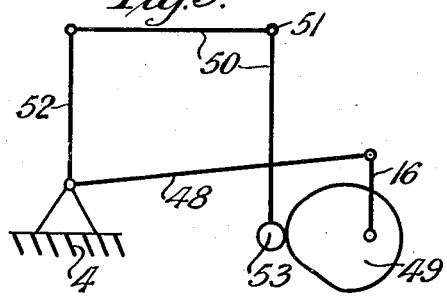
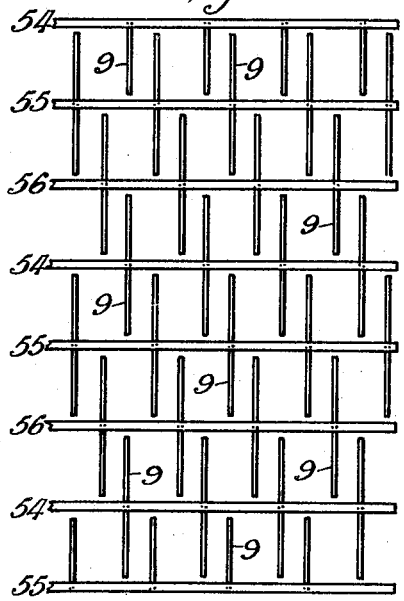

Patented Oct. 25, 1932

1,885,064

UNITED STATES PATENT OFFICE

RUPERT OCTAVIUS STOKES, OF LONDON, ENGLAND

CONVEYING MECHANISM

Application filed May 23, 1932, Serial No. 613,087, and in Great Britain February 5, 1932.

The invention relates to conveying mechanism of the kind in which the material to be conveyed is moved along a surface, usually up an incline, by means of a reciprocating rake.

Such conveying mechanism forms in some cases an integral part of classifiers for ores and the like. The mixed ore is suspended in water and the conveying mechanism raises the settled larger or heavier pieces up a slope to a suitable discharge point while the smaller or lighter constituents remain in suspension on account of the agitation of the water and are discharged therewith over a weir. In operation some form of transmission gear is used which moves the rake upwards parallel to the sloping base or trough in close proximity thereto and then returns it along an elevated path to the initial position for a fresh cycle.

It will be seen that during the return stroke of the rake the material being conveyed is not prevented from sliding down the inclined surface of the conveyor except by friction. The object of the present invention is to provide a more definite control of the material being conveyed, whereby the output and efficiency of the conveyor may be increased.

According to the invention in conveying mechanism of the kind in which the material to be conveyed is moved along a surface by means of a reciprocating rake, a plurality of rakes so driven as to be at any one instant at different points of their cycle of movement are so located that one or more longitudinal strips of the surface are swept by the blades or other pushing members of more than one rake. The longitudinal strips of surface will usually be as nearly as possible contiguous, only leaving gaps of sufficient width to clear the parts of the rakes supporting the blades or the like. Thus a practically continuous conveying movement may be imparted to the material and where the surface is inclined it may be made considerably steeper without incurring the risk of the material sliding back during the return stroke of the rake.

Obviously the invention is not limited to classifiers for ore and the like; it is just as applicable to ordinary conveyors of the reciprocating rake type whether intended for conveying material dry or submerged in a liquid.

The accompanying drawings illustrate the application of the invention to classifiers.

In the drawings—

Figure 1 is a plan partly broken away of a classifier,

Figure 2 is an elevation of the same,

Figure 3:
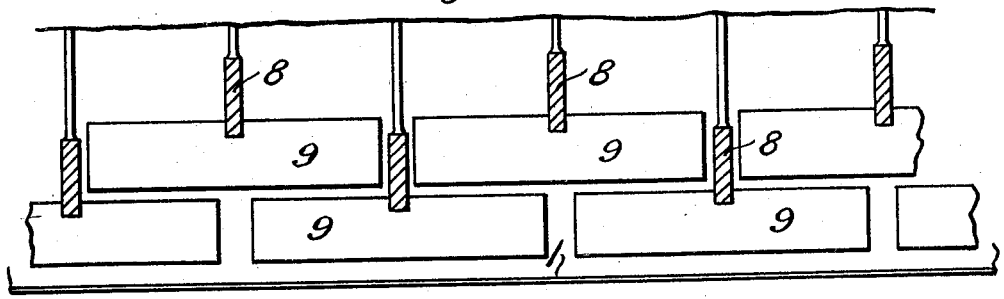
Figure 3 is a part end elevation to show the arrangement of the blades.
Figure 6:
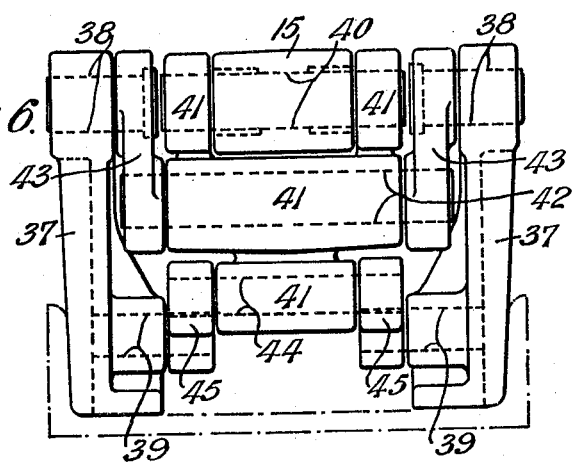
Figure 7:
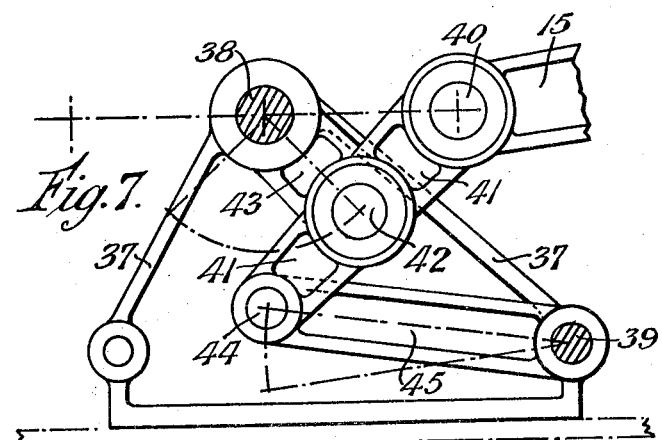

Figure 4 is a sectional elevation and Figure 5 an end elevation of a square motion gear which may be used in place of the gear shown in Figures 1 to 3, Figure 6 is an end elevation and Figure 7 a side elevation of a straight line movement which may be used with the classifier of Figures 1 to 3 in place of the arrangement shown, Figure 8 is an elevation of a straight line guide for the same purpose, Figure 9 is a diagrammatic elevation of an alternative drive by cam and eccentric, and Figure 10 is a diagrammatic plan of a modification showing three rakes.

Referring first of all to figures 1, 2 and 3, the classifier tank 1 is shown for convenience of drawing with its base horizontal. The true horizontal is indicated by the liquid level 2. The liquid containing the solids in suspension is fed in by the trough 3, the rakes 4, 5 agitate the liquid so that the finer materials remain in suspension and are discharged with the overflow at 6. The coarser particles fall to the bottom and are moved by the reciprocating rakes 4 and 5 up the sloping bottom of the tank 1 to be discharged at the point 7.

The rake 4 is made up of rectangular bars 8 set on edge and running parallel to the base of the tank. Each bar 8 carries a set of blades 9 set at equal intervals along the length of the bar. These blades form the operative portion of the rake and move the heavier particles along the bottom of the tank. The spacing between corresponding blades 9 on adjacent bars 8 is a little greater than the width of a rectangular bar 8 so that each bar 8 of one rake can pass between the blades 9 of the other without fouling.

All the bars 8 of one rake 4 are connected by cross-bars 10 provided with lugs 11, by which they are suspended by bell-crank levers 12, 13. The bell-crank lever 12 has one arm parallel to a corresponding arm of the bell-crank lever 13 and is connected to it by a link 14, ensuring that the whole of the rake moves parallel to itself at all times. The other arm of the bell-crank lever 13 is extended to form a connecting rod 15 to the crank 16 driven through reduction gearing 17 by means of the shaft 18 and pulley 19. The pivots 20 of the bell-crank levers 12 and 13 are mounted at the centres of rolling quadrants 21 engaging racks 22 which ensure that the movement of the pivots 20 shall be rectilinear and parallel to the base of the tank 1.

In an exactly similar way the crank 23 drives the rake 5 but is set at an angle of 180° to the crank 16. Since the crank pins describe circles and the pivots 20 are constrained to move in a straight line it will be seen that the points of suspension of the rakes move in an elliptical path and that one rake 4 is always 180° out of phase with the other rake 5.

It is preferable, although not necessary, for the movement of each rake to be a little more than a multiple of the distance between successive blades. It will be seen that owing to the elliptical motion of the rakes there will be a slight heaping up of material midway between the blades at their mean position. If the other set of blades is set so as to have its mean position midway between the blades of the first set this heaping up of material is almost entirely obviated and the disadvantage of the elliptical path is practically removed.

In one practical example the stroke of each rake was twice the spacing between the blades, thus the heaping up of material due to the elliptical path was very slight when using two rakes as above described.

As, however, the elliptical motion may be objectionable in certain cases, a construction will now be described giving practically rectilinear motion. This is based on the means for obtaining a square motion disclosed in my U. S. patent specification No. 1,603,995. The construction of the tank and rakes may be similar to that shown in Figures 1, 2 and 3, but the reduction gearing 17 would be replaced by the gearing shown in Figures 4 and 5.

The gear-wheel 24 of the reduction gearing is a composite structure comprising the outer tooth carrying part 25, two discs 26, 27 and two bosses 28, 29. These five parts are bolted together to form a single rigid structure. The journals are formed on the bosses 28, 29 to run in the bearings 30. The disc 26 has a bushed hole 31 a little off the centre line forming a bearing for a crank shaft 32 on which is mounted a pinion 33. The part of the boss connecting the flange to the journal is made of crescent-shape, as can be seen dotted in Figure 5 so that one side of the pinion is exposed for engagement as will shortly be explained.

The crank shaft runs in an outer bearing 34 in the boss 28 and at its outer end carries the crank 16 which is connected to its rake as previously described. The pinion 33 engages the internal gear 35 which is fixed to the gear case 36. The pitch line diameter of the pinion 33 is three-quarters of that of the internal gear 35. It will be seen that the resultant movement of the crank 16 will be substantially a square with slightly rounded corners.

The disc 27 and boss 29 carry similar parts, but these parts are set 180° away from the corresponding parts relating to disc 26 and boss 28; the cranks 16 and 23 are thus always oppositely phased in their movements. By using this gearing the movement of the crank follows a square but the movement of the intermediate point of the connecting rod 15 (Figure 1) to which the rake is attached will be a rectangle having the same length horizontally as the side of the square but having a reduced vertical height.

Figures 6 and 7 show an alternative construction of the straight line motion for the small end of the connecting rod. The structure 37 forming part of the tank has two fixed pivots 38 and 39. The connecting rod 15, of which only a small piece is shown, is pivoted at 40 to the top end of an intermediate link 41. An intermediate point 42 on this link is pivoted to a link 43 which itself is pivoted at 38. The point 42 is thus constrained to follow a circular path. The bottom end of the link 41 is pivoted at 44 to a fairly long radial arm 45 which itself is pivoted at 39. The point 44 is therefore constrained to move almost vertically up and down. The resultant movement of the point 40 is practically horizontal. Figure 6 shows the practical construction in which the forces are balanced by duplicating certain of the links and pivots. This straight line movement may be applied either to the mechanism shown in Figures 1 to 3 giving an elliptical motion or to the modified construction in which a square motion gear is used as shown in Figures 4 and 5.

It is also possible to pivot the link 41 at its end 44 on a fixed part of the structure, omitting the links 43 and 45; the upper pivot 40 of the link carrying the small end of the connecting rod 15 then describes an arc of a circle and as a result of this the path of the intermediate point of the connecting rod to which the rake is suspended is no longer an ellipse. It may be considered as derived from an ellipse by flattening the lower side and curving the upper side. The result of this is that the blades are kept nearer to the surface of the conveyor throughout their working stroke.

A further alternative arrangement for guiding the pivots 20 of the bell-crank levers 12 and 13 is shown in Figure 8. The small end of the connecting rod 15 is here shown pivoted to a cross-head 46 movable horizontally in a slide 47, the construction being one well known in steam engine practice.

A modified drive for the rakes is shown in Figure 9. The reciprocating movement of each rake is produced by a connecting rod 48 pivoted at one end to an appropriate part of the rake and at the other end to the crank 16. The crank shaft also carries a cam 49 shaped to raise and lower the rake at the appropriate times through the bell-crank lever 50 having a stationary pivot 51. This lever is connected by a link 52 to the rake and is provided with a cam follower at 53 which is kept in contact with the cam by the weight of the rake. Similar driving mechanism would then be used for the other rake or rakes.

A modified arrangement of rakes is shown diagrammatically in Figure 10. This shows how more than two rakes may be arranged in accordance with the invention. The bars 54 with their blades constitute one rake, the bars 55 a second, and the bars 56 a third. The blades of the outside bars extend in one direction only from the bars. The three rakes are driven from cranks differing by 120° in phase. Such an arrangement may be found advantageous for some purposes as it gives more continuous pushing of the blades on the material, but on the other hand the gaps between the blades of any one row must be larger than with only two rakes so as to clear the blades of both the other rakes. This arrangement is, however, of particular interest when used in conjunction with the square motion gear shown in Figures 4 and 5. If the crank 16 in that figure were replaced by a disc it would be found that three points equidistant from the centre of the crank shaft in direction 120° apart carry out exactly the same movement but 120° different in phase. One of these points is one of the crank pins shown in these figures and if two further cranks were provided corresponding to the other two points only one pinion 33 with its corresponding internal gear would be required.

What I claim is:—

1. Conveying mechanism comprising a surface along which material is adapted to be conveyed in a given direction, a plurality of rakes located with blades interlapping in the said direction and means for imparting a cyclic movement to the rakes near the surface in the said direction and further from it in the reverse direction, said rakes being at any instant at different points of their cycle of movement.

2. Conveying mechanism comprising a surface along which material is adapted to be conveyed in a given direction, two rakes located with blades interlapping in the said direction, means for imparting a cyclic movement to one rake near the surface in the said direction and further from it in the reverse direction and means for imparting a similar but oppositely phased movement to the other rake.

3. Conveying mechanism comprising a surface along which material is adapted to be conveyed in a given direction, two rakes located with blades interlapping in the said direction, two cranks 180° apart, means for driving the cranks, two connecting rods pivoted one to each crank and means for guiding the other end of each connecting rod in a direction substantially parallel to the conveying direction, each rake being pivotally attached to one connecting rod at an intermediate point in its length.

4. Conveying mechanism comprising a surface along which material is adapted to be conveyed in a given direction, two rakes located with blades interlapping in the said direction, two cranks 180° apart, means for driving the cranks, two connecting rods pivoted one to each crank, rolling surfaces substantially parallel to the conveying direction and provided with rack teeth, and quadrants engaging said rolling surfaces and pivotally connected at their centres to the connecting rods, each rake being pivotally attached to one connecting rod at an intermediate point in its length.

5. Conveying mechanism comprising a surface along which material is adapted to be conveyed in a given direction, two rakes located with blades interlapping in the said direction, two cranks 180° apart, means for driving the cranks, two connecting rods pivoted one to each crank and link gear for the other end of each connecting rod comprising an intermediate rocking link approximately perpendicular to the conveying direction in its mean position pivoted at an intermediate point thereof to a fixedly pivoted link approximately parallel to it in its mean position and at an end thereof to a fixedly pivoted radial arm approximately perpendicular to it in its mean position and at the other end to the connecting rod, each rake being pivotally attached to one connecting rod at an intermediate point in its length.

6. Conveying mechanism comprising a surface along which material is adapted to be conveyed in a given direction, a plurality of rakes located with blades interlapping in the said direction and means for imparting substantially rectangular cyclic movement to the rakes near the surface in the said direction and further from it in the reverse direction, said rakes being at any instant at different points of their cycle of movement.

7. Conveying mechanism comprising a surface along which material is adapted to be conveyed in a given direction, a plurality of rakes located with blades interlapping in the said direction and means for imparting substantially rectangular cyclic movement to the rakes near the surface in the said direction and further from it in the reverse direction, said rakes being at any instant at different points of their cycle of movement and said means for imparting a substantially rectangular movement comprising a gear-wheel, means for driving the gear-wheel, a pinion excentrically journalled in said gear-wheel, a stationary internal gear meshing with said pinion and a crank mounted on the pinion shaft.

8. Conveying mechanism comprising a surface along which material is adapted to be conveyed in a given direction, two rakes located with blades interlapping in the said direction, a gear-wheel, means for driving the gear-wheel, two pinions oppositely and excentrically journalled in the said gear-wheel, stationary internal gear meshing with said pinions, cranks mounted on said pinion shafts, two connecting rods pivoted one to each crank, and means for guiding the other end of each connecting rod in a direction substantially parallel to the conveying direction, each rake being pivotally attached to one connecting rod at an intermediate point in its length.

9. Conveying mechanism comprising a surface along which material is adapted to be conveyed in a given direction, a plurality of rakes located with blades interlapping in the said direction, a crank coupled to each rake to reciprocate it in the said direction, eccentric means connected to each rake to raise and lower it respectively near the ends of its reciprocating movement, said crank and eccentric means associated with each rake being so set that one rake is at a different point of its cycle of movement from another rake.

In testimony that I claim the foregoing as my invention, I have signed my name this 13th day of May 1932.

RUPERT OCTAVIUS STOKES.